(12) United States Patent
Otsubo

(10) Patent No.: US 11,567,611 B2
(45) Date of Patent: Jan. 31, 2023

(54) DISPLAY SHEET

(71) Applicant: Asukanet Company, Ltd., Hiroshima (JP)

(72) Inventor: Makoto Otsubo, Hiroshima (JP)

(73) Assignee: ASUKANET COMPANY, LTD., Hiroshima (JP)

( * ) Notice: Subject to any disclaimer, the term of this patent is extended or adjusted under 35 U.S.C. 154(b) by 0 days.

(21) Appl. No.: 17/299,465

(22) PCT Filed: Dec. 11, 2019

(86) PCT No.: PCT/JP2019/048476
§ 371 (c)(1),
(2) Date: Jun. 3, 2021

(87) PCT Pub. No.: WO2020/129772
PCT Pub. Date: Jun. 25, 2020

(65) Prior Publication Data
US 2022/0011901 A1 Jan. 13, 2022

(30) Foreign Application Priority Data
Dec. 20, 2018 (JP) .............................. JP2018-238317

(51) Int. Cl.
G06F 3/041 (2006.01)
G06F 3/042 (2006.01)
(Continued)

(52) U.S. Cl.
CPC .......... *G06F 3/0421* (2013.01); *G06F 3/0321* (2013.01); *G06F 3/0412* (2013.01); *H04N 5/33* (2013.01)

(58) Field of Classification Search
CPC .... G06F 3/0421; G06F 3/0321; G06F 3/0412; H04N 5/33
See application file for complete search history.

(56) References Cited

U.S. PATENT DOCUMENTS

2012/0056089 A1* 3/2012 Fu ..................... H03K 17/941
29/622
2012/0188188 A1 7/2012 Smith
(Continued)

FOREIGN PATENT DOCUMENTS

JP 2000-56928 A 2/2000
JP 2006-39745 A 2/2006
(Continued)

OTHER PUBLICATIONS

International Search Report dated Jan. 28, 2020, issued in counterpart International Application No. PCT/JP2019/048476 (2 pages).
(Continued)

*Primary Examiner* — Towfiq Elahi
(74) *Attorney, Agent, or Firm* — WHDA, LLP

(57) ABSTRACT

A display sheet 10 according to the present invention is to be used while being placed on a display 11, and includes: infrared-light emitting elements 15 that emit infrared light from on the display 11 to a space; infrared-light receiving elements 16 that receive infrared light proceeding to the display 11 from the space; and transmitting portions 17 that passes light emitted from the display 11 to the space. The infrared-light emitting elements 15, the infrared-light receiving elements 16, and the transmitting portions 17 are formed into a sheet in a state of being arranged side by side or arranged to be scattered. Merely by placing the display sheet 10 on the display 11 and teaming them with an optical image-forming means, an aerial-image-forming type input device can be obtained with no need of separately preparing a dedicated display or infrared-light emitter. Thus, it is excellent in versatility.

4 Claims, 3 Drawing Sheets

(51) Int. Cl.
  *G06F 3/03*  (2006.01)
  *H04N 5/33*  (2006.01)

(56) References Cited

U.S. PATENT DOCUMENTS

| | | |
|---|---|---|
| 2016/0091979 A1 | 3/2016 | Liu et al. |
| 2018/0011605 A1* | 1/2018 | Otsubo ................ G06F 3/041 |
| 2018/0284944 A1 | 10/2018 | Otsubo |
| 2018/0364868 A1 | 12/2018 | Otsubo |

FOREIGN PATENT DOCUMENTS

| | | |
|---|---|---|
| JP | 2011-29919 A | 2/2011 |
| JP | 2013-504108 A | 2/2013 |
| JP | 2013-117935 A | 6/2013 |
| JP | 2014-115733 A | 6/2014 |
| JP | 5509391 B1 | 6/2014 |
| JP | 2016-071836 A | 5/2016 |
| JP | 2016-136381 A | 7/2016 |
| JP | 2016-154035 A | 8/2016 |
| JP | 2017-142577 A | 8/2017 |

OTHER PUBLICATIONS

Notice of Reasons for Refusal dated Jun. 9, 2020, issued in counterpart JP Patent Application No. 2020-506839, w/ English translation (6 pages).
Notice of Reasons for Refusal dated Nov. 10, 2020, issued in counterpart JP Patent Application No. 2020-506839, w/English translation (6 pages).
Decision to Grant a Patent dated Mar. 30, 2021, issued in counterpart JP Patent Application No. 2020-506839, w/English translation (5 pages).
Notice of Reasons for Refusal dated Aug. 16, 2022, issued in related JP patent application No. 2021-074138, with English Translation. (4 pages).
Decision of Refusal dated Nov. 1, 2022, issued in related JP patent application No. 2021-074138 with amended claim submitted on Oct. 3, 2022, with English Translation. (6 pages).

* cited by examiner

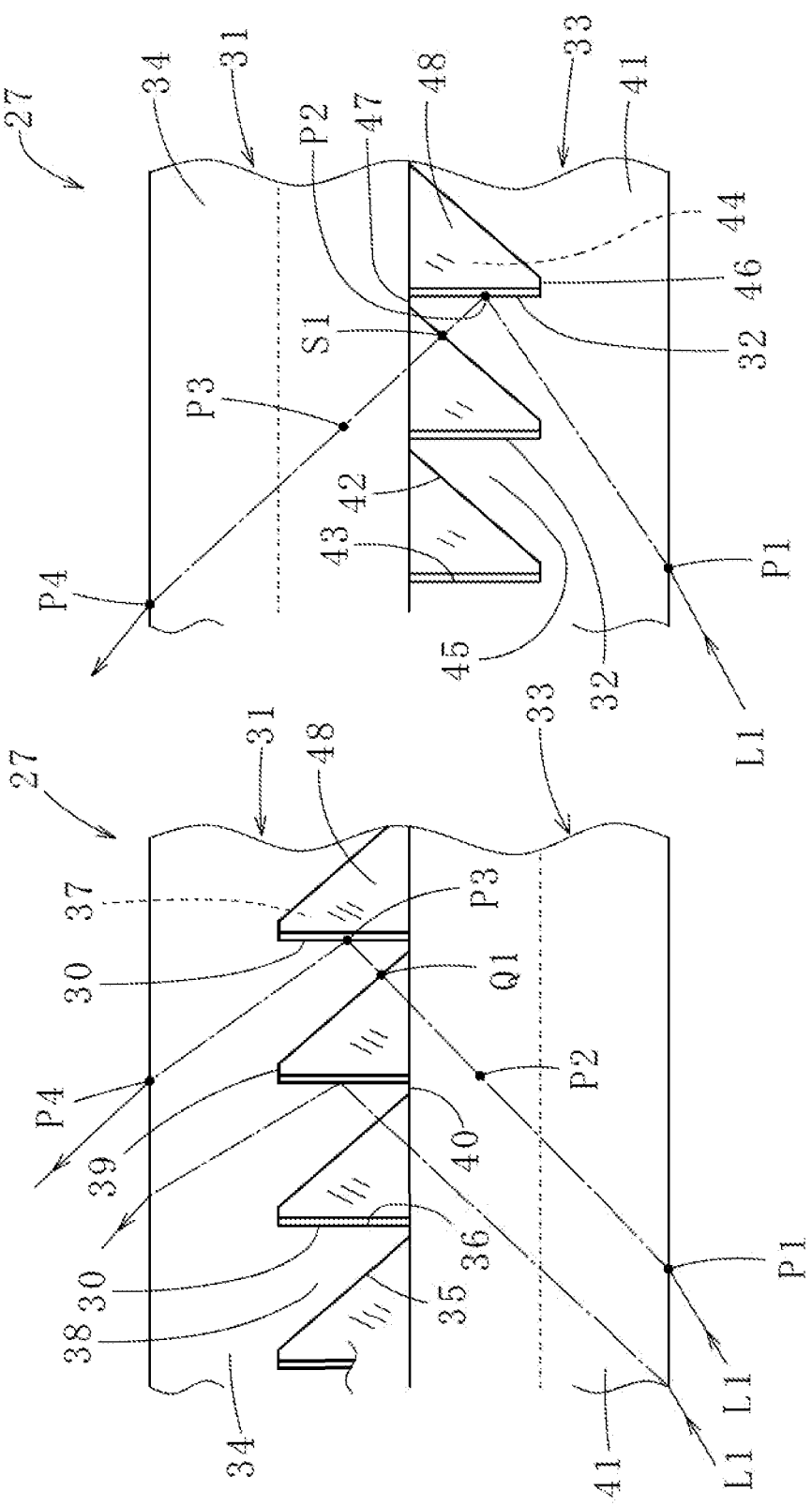

DISPLAY SHEET

TECHNICAL FIELD

The present invention is related to a display sheet with which when a specific position on a real image formed in the air is indicated with a indicating means (e.g., a finger), the indicated position can be easily and reliably detected in a non-contact manner.

BACKGROUND ART

A touch panel provided with a display (i.e., displaying equipment), in which when an image is displayed on the display and a specific position on the displayed image is pressed with a finger, X and Y coordinates of the pressed position are detected with a pressure sensor or something, and a subsequent, action is executed depending on input signal, has been conventionally known (e.g., patent literature 1).

In patent literature 2, a large number of light emitting elements and light receiving elements are arranged directly on a display along X and Y axes in a parallel manner and formed into a matrix, and when the surface of the display is touched with an obstacle such as a finger or a pen (i.e., an indicating means), the directly touched position on the display is detected by using the obstacle going across the matrix.

On the other hand, in a method and apparatus suggested in patent literature 3, an image of a display and an image in which infrared light irregularly reflects off the surface of the display, are displayed in the air as reproduced images at the same time, using an optical image-forming means, and a position of an indicating means having touched the reproduced image of the display is detected with a two-dimensional infrared camera, thereby detecting the indicated position on the reproduced image of the display. The optical image-forming means includes: a first light-control panel having a large number of first flat light-reflecting parts arranged in parallel at constant intervals inside a transparent flat board; and a second light-control panel having a large number of second flat light-reflecting parts arranged in parallel at constant intervals inside a transparent flat board, and the first and second light-control panels are so disposed as to be in direct contact with each other or as to be adjacent to each other in a state where the first flat light-reflecting parts and the second flat light-reflecting parts are orthogonally crossed when viewed from above.

Also, a displaying apparatus and method for contactless input in patent literature 4 includes: an optical image-forming means, in which a large number of first micro reflecting surfaces so disposed as to stand upright on a flat surface and a large number of second micro reflecting surfaces so disposed as to stand upright on a flat surface are orthogonally crossed when viewed from above; and a display disposed on one side of the optical image-forming means, forms an image of the display as a first image on the other side of the optical image-forming means, and optically detects the position in the image of an indicating means having touched the first image. In this apparatus and method, light sensors for detecting light only coming from the front side are provided on the surface of the display, reflected light from the indicating means forms an image on the display through the optical image-forming means as a second image, and the position of the second image is detected with the light sensors.

Additionally, as described in patent literature 5, an apparatus that is provided with light sensors inside a transistor-shaped surface composing a liquid-crystal panel, and recognizes multi-touch with fingers on the surface of the liquid-crystal panel and motion with a touch pen, has been suggested.

CITATION LIST

Patent Literature

Patent Literature 1: Japanese Unexamined Patent Application Publication No. 2006-39745
Patent Literature 2: Japanese Unexamined Patent Application Publication No. 2000-56928
Patent Literature 3: Japanese Patent No. 5509391
Patent Literature 4: Japanese Unexamined Patent Application Publication No. 2017-142577
Patent Literature 5: Japanese Unexamined Patent Application Publication No. 2011-29919

SUMMARY OF INVENTION

Technical Problem

However, patent literatures 1 and 2 have a structure where a specific flat image is displayed on a flat display existing at the back side of the touch panel and when a specific position on the display is pressed, the input (i.e., pressed) position is detected. Therefore, an indicating means such as a finger or a pen hits the surface of the display whenever pressing the image with such an indicating means, which can get the display dirty or leave a scratch on it.

Patent literature 3 requires an infrared light source, an irregular-reflection surface of infrared light, and an infrared camera in addition to the display panel, thereby possessing a problem that the apparatus configuration becomes complicating.

In patent literature 4, installing light sensors, which consists of a light sensor sheet formed into a sheet-like state, on the front side of the display eliminates the need to incorporate the light sensors into the display. However, in order to obtain the reflected light from the indicating means, a dedicated display with an infrared light emitter incorporated inside needs to be prepared, or an infrared light emitter needs to be installed outside the display. So, patent literature 4 lacks versatility and possesses a problem of causing the configuration to be complicating and the device to be larger.

Patent literature 5 is not an aerial-image-forming type (i.e., contactless) input device such as patent literatures 3 and 4, but an optical touch panel, which is provided with light sensors incorporated inside a liquid-crystal panel and recognizes, by using reflected light, that an indicating means such as a finger or a touch pen touches the liquid-crystal panel. Although such touch panels with a display are used in ATMs or the like, it is not sanitary because many and unspecified people touch the screen and is not useful in the prevention of infection through contact. Besides, when the display is illuminated with light, the reflected light is radiated from the display and the display can become difficult to see.

The present invention has been made in consideration of the above circumstances, and has as its object to provide a versatile display sheet with which an aerial-image-forming type (i.e., contactless) input device can be obtained merely by placing the display sheet on a display and teaming them with an optical image-forming means with no need to separately prepare a dedicated display or an infrared light emitter.

Solution to Problem

In order to achieve the above object, according to the present invention, there is provided a display sheet to be used while being placed on a display, the display sheet including:
  a plurality of infrared-light emitting elements emitting infrared light from on the display to a space;
  a plurality of infrared-light receiving elements receiving infrared light proceeding to the display from the space; and
  a plurality of transmitting portions passing light emitted from the display to the space,
  wherein the infrared-light, emitting elements, the infrared-light receiving elements, and the transmitting portions are formed into a sheet in a state of being arranged side by side or arranged to be scattered.

Although the infrared-light receiving elements are preferred to be provided with a filter in order not to detect visible light, this is not a necessarily required condition. Parts for supporting the infrared-light emitting elements, the infrared-light receiving elements, and the transmitting portions in predetermined positions may be non-light-transmitting. Alternatively, it may be so made as to form portions except for the infrared-light emitting elements and the infrared-light receiving elements with a transparent material (e.g., a transparent sheet) and to have part of the transparent material or the entire transparent material serve as the transmitting portions for light from the display.

In the display sheet according to the present invention, it is preferred that either one or both of the infrared-light emitting elements and the infrared-light receiving elements be each provided with an enclosure. This prevents erroneous detection where, for example, on the display light from the infrared-light emitting elements directly enters the infrared-light receiving elements.

In the display sheet according to the present invention, it is preferred that a high-frequency modulation or a digital modulation be applied to the infrared light emitted by the infrared-light emitting elements.

Advantageous Effects of Invention

By placing the display sheet according to the present invention on a display, light emitted from the display passes through the transmitting portions and enters the optical image-forming means, which is disposed with a predetermined distance from the display, from one side of the optical image-forming means, and thus, an image displayed on the display is formed on the other side of the optical image-forming means, as a first real image (i.e., an aerial image). At the same time, also infrared light emitted by the infrared-light emitting elements toward the space enters the optical image-forming means from the one side of the optical image-forming means, and is directed onto the first real image formed on the other side of the optical image-forming means. Then, when an indicating means touches the first real image, the infrared light having reflected off the indicating means enters the optical image-forming means from the other side of the optical image-forming means, and forms an image as a second real image on the surface of the display sheet placed on the display disposed on the one side of the optical image-forming means. Therefore, by detecting the position of the second real image with the infrared-light receiving elements, the position indicated (i.e., touched) by the indicating means with respect to the first real image can be easily and reliably detected.

In the display sheet according to the present invention, when either one or both of the infrared-light emitting elements and the infrared-light receiving elements are each provided with an enclosure, the position indicated with the indicating means can be accurately detected because the enclosures prevent the infrared light emitted by the infrared-light emitting elements from being directly received by the infrared-light receiving elements, and thus only the infrared light having reflected off the indicating means and then formed on the surface of the display sheet as the second real image (i.e., the reflected light), is received by the infrared-light receiving elements.

In the display sheet according to the present invention, when a high-frequency modulation or a digital modulation is applied to the infrared light emitted by the infrared-light emitting elements, the infrared light having been emitted by the infrared-light emitting elements and then having reflected off the indicating means can be distinguished from infrared light existing in nature by using the infrared-light receiving elements, and this enhances the detection accuracy when detecting the position indicated with the indicating means.

BRIEF DESCRIPTION OF DRAWINGS

FIGS. 3(A) and 3(B) are a front cross-sectional view and a side cross-sectional view, respectively, of an optical image-forming means in the same contactless input device.

DESCRIPTION OF EMBODIMENTS

An embodiment of the present invention will be described next with reference to the accompanying drawings.

Figure 1:
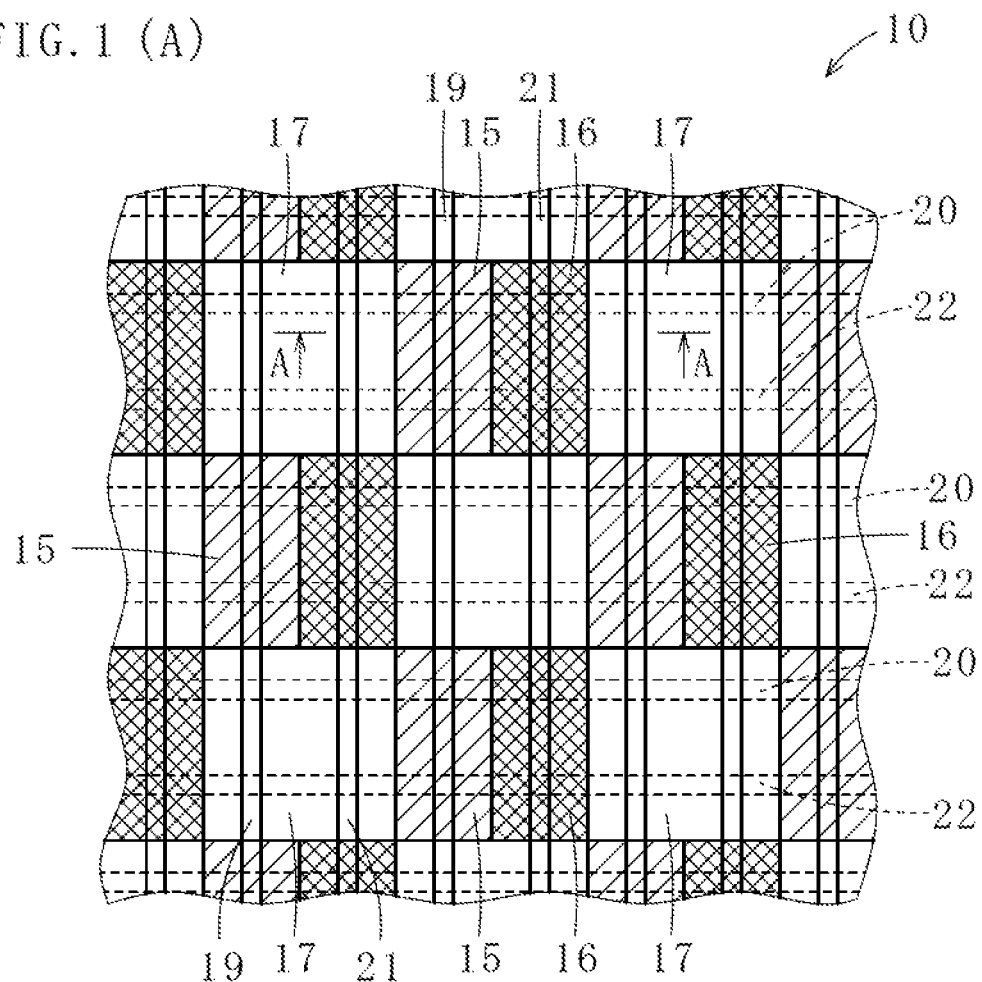
FIG. 1(A) is a partial plan view of a display sheet according to an embodiment of the present invention.
FIG. 1(B) is a cross-sectional view of FIG. 1(A) cut along a line A-A.
Figure 1:
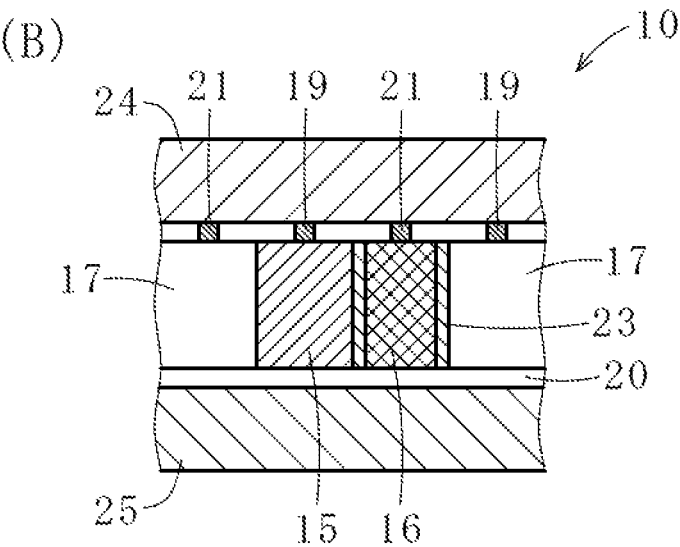
Figure 2:
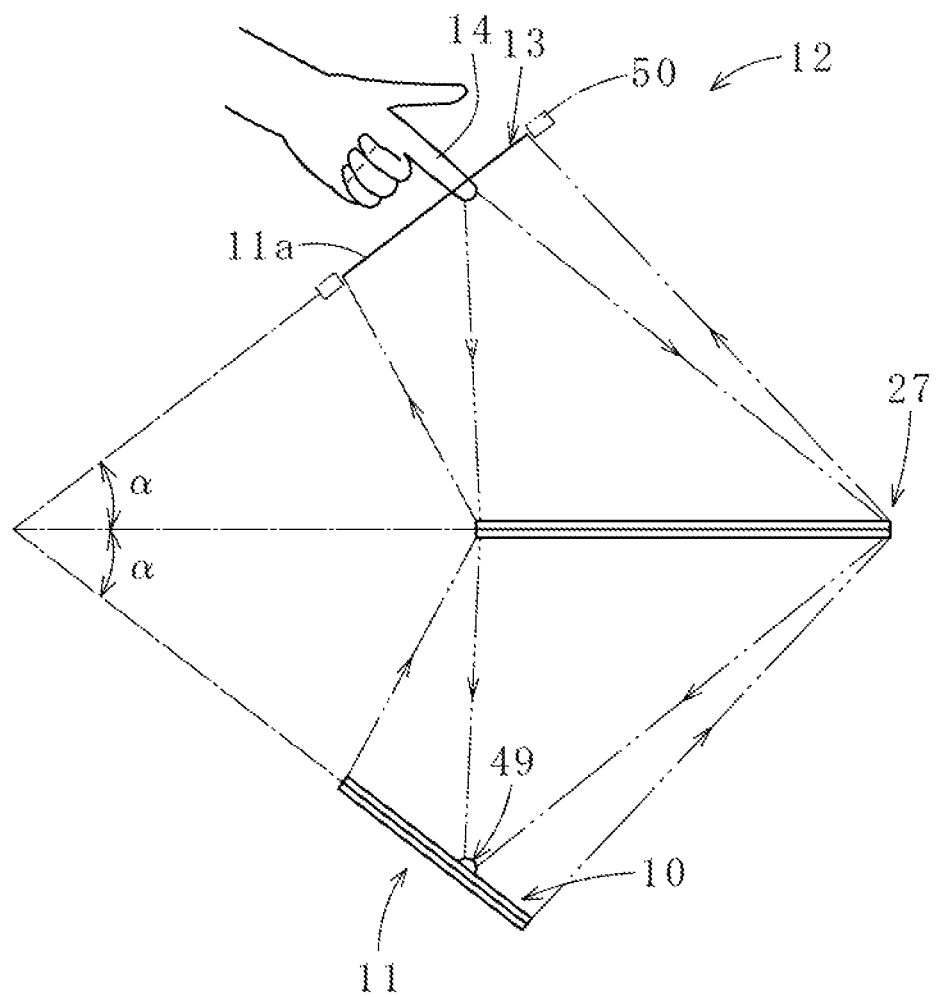
FIG. 2 is an explanatory figure of a contactless input device using the same display sheet.

A display sheet 10 according to the embodiment of the present invention, shown in FIGS. 1(A) and 1(B), is to be used while being placed on a display 11 as shown in FIG. 2 and is to constitute a part of a contactless input device 12, and when a specific position on a first real image 13 formed in the air is indicated with an indicating means (e.g., a finger) 14, the display sheet 10 detects the indicated position in a non-contact manner. As the display, for example, a displaying unit having concavities and convexities only on one side just like a keyboard and emitting light may be used other than a display in a flat board shape such as a usual liquid-crystal display. Note that, however, when using a displaying unit with concavities and convexities such as a keyboard or the like, the display sheet is preferred to be disposed in parallel to the concave surfaces or the convex surfaces.

As shown in FIGS. 1(A), 1(B), and 2, the display sheet 10 includes: infrared-light emitting elements 15 for emitting infrared light from on the display 11 to a space; infrared-light receiving elements 16 for receiving infrared light proceeding to the display 11 from the space; and transmitting portions 17 for passing light emitted from the display 11 to the space, and the infrared-light emitting elements 15, the infrared-light, receiving elements 16, and the transmitting portions 17 are formed into a sheet in a state of toeing arranged side by side or arranged to be scattered. Parts for supporting them are made of a non-light-transmitting material that does not pass visible light rays, infrared light rays, or the like through. Incidentally, it may be so made as to form portions except for the infrared-light emitting elements 15 and the infrared-light receiving elements 16 with a transparent material (e.g., a transparent sheet) and to have the transparent material serve as the transmitting portions for light from the display 11.

As shown in FIGS. 1(A) and 1(B), above and beneath the infrared-light emitting elements 15 transparent electrodes 19 and 20 that are each in a strip-like shape and for supplying power to the infrared-light emitting elements 15 are arranged to form a grid, and above and beneath the infrared-light receiving elements 16 transparent electrodes 21 and 22 that are for getting signals from the infrared-light receiving elements 16 when they receive infrared light, are arranged to form a grid. To the back side of each infrared-light receiving element 16 (i.e. the side not intended to sense infrared light), it is preferred that a non-light-transmitting portion using, e.g., a non-light-transmitting sheet be provided so that the light of the display 11 is not detected from the back side.

Around each infrared-light receiving element 16, as shown FIG. 1(B), an enclosure (i.e., a partition) 23 is provided so as to prevent infrared light emitted by the infrared-light emitting elements 15 around from directly being received by the infrared-light receiving elements 16. Although the enclosure 23 is provided only for each infrared-light receiving element 16 in this embodiment, an enclosure may be provided for each infrared-light emitting element 15 instead, or may be provided for both each infrared-light emitting element 15 and each infrared-light receiving element 16. In cases where the enclosure is provided for both each infrared-light emitting element and each infrared-light receiving element, it is preferred that the enclosure for each infrared-light, emitting element be (1.5 times to 3 times) higher than the enclosure for each infrared-light receiving element.

Additionally, the upper-most surface and the lower-most surface of the display sheet 10 are, as shown in FIG. 1(B), covered respectively by transparent protection beards 24 and 25. In here, the transmitting portions 17 are only required to pass the light emitted from the display 11 and a transparent resin is suitable to form them; however, if the transparent electrodes 19 and 21 are formed on the protection board 24 and the transparent electrodes 20 and 22 are formed on the protection board 25, the transmitting portions 17 may be left hollow or filled up with a transparent resin. In particular, it is preferred that non-light-reflective treatment be applied to the back side of each infrared-light emitting element 15 so that the infrared-light receiving elements 16 do not react to infrared light from the infrared-light emitting elements 15.

A contactless input device 12 includes, as shown in FIG. 2, an optical image-forming means 27 disposed away from the display 11 at a degree a of 30 to 60 degrees with respect to the display 11. Light from an image displayed on the display 11 passes through the transmitting portions 17 of the display sheet 10, enters the optical image-forming means 27 from one side of the optical image-forming means 27, and forms an image as a first real image (i.e., an aerial image) 13 on the other side (at a position to be symmetrical to the display 11 with the optical image-forming means 27 in-between; this position is hereinafter referred to as an image-formed surface 11a) of the optical image-forming means 27.

The details of the optical image-forming means 27 will be explained below.

The optical image-forming means 27, as shown in FIGS. 3(A) and 3(B), includes: a first light-control part 31 having a plurality of light reflecting surfaces 30 arranged in a standing position with gaps between them; and a second light-control part 33 having a plurality of light reflecting surfaces 32 arranged in a standing position with gaps between them, and the first and second light-control parts 31 and 33 are so arranged (i.e., integrated) as to be placed on top of each other in the thickness direction while the light reflecting surfaces 30 and 32 are orthogonally crossed when viewed from above to form the optical image-forming means 27.

A first molded-preform is made of a first transparent resin and has on one side of a first transparent board material 34: a plurality of triangular-cross-sectional grooves 37 each including an inclined surface 35 and a vertical surface 36 and arranged at a predetermined pitch; and a plurality of triangular-cross-sectional ridges 38 each formed between the grooves 37 adjacent to each other and arranged at a predetermined pitch, and the first light-control part 31 is made by forming the light reflecting surfaces 30 made of mirror surface (i.e., metal reflective surface) onto the vertical surfaces 36 of the grooves 37 of the first molded-preform. To the bottom portion of each groove 37 (i.e., between the lower edge of the inclined surface 35 and the lower edge of the vertical surface 36), and to the top portion of each ridge 38 (i.e., between the upper edge of the inclined surface 35 and the upper edge of the vertical surface 36), a micro flat portion 35 and a micro flat portion 40 are formed, respectively.

A second molded-preform is made of a second transparent resin and has on an other side of a second transparent board material 41: a plurality of triangular-cross-sectional grooves 44 each including an inclined surface 42 and a vertical surface 43 and arranged at a predetermined pitch; and a plurality of triangular-cross-sectional ridges 45 each formed between the grooves 44 adjacent to each other and arranged at a predetermined pitch, and the second light-control part 33 is made by forming the light reflective surfaces 32 made of mirror surface (i.e., metal reflective surface) onto the vertical surfaces 43 of the grooves 44 of the second molded-preform. To the bottom portion of each groove 44 (i.e., between the lower edge of the inclined surface 42 and the lower edge of the vertical surface 43), and to the top portion of each ridge 45 (i.e., between the upper edge of the inclined surface 42 and the upper edge of the vertical surface 43), a micro flat portion 46 and a micro flat portion 47 are formed, respectively.

However, the micro flat portions 40 and 47 are preferred not to be there.

The grooves 37 and 44 disposed to face each other are filled up with a transparent resin 43.

Note that it is preferred that a refractive index $\eta 1$ of the first transparent resin and a refractive index $\eta 2$ of the second transparent resin be equivalent (i.e., the refractive index $\eta 1$ is 0.95 to 1.0 times the refractive index $\eta 2$), and that a refractive index $\eta 3$ of the transparent resin 48 to be used to fill up the gap between the first and second transparent resins be within a range of 0.8 to 1.2 times (more preferably, 0.9 to 1.1 times; much more preferably, 0.95 to 1.05 times) the refractive indexes $\eta 1$ and $\eta 2$ of the first and second transparent resins.

As the first and second transparent resins, thermoplastic resins such as cycloolefin polymers, polymethylmethacrylate (i.e., acrylic resins), amorphous fluoropolymers, PMMA, optical polycarbonates, fluorinated polyesters, and polyethersulfone may be used; however, those with a high melting point and a high transparency are particularly suitable for use.

As the method for forming the mirror surfaces (i.e., the metal reflective surfaces), sputtering, metal evaporation, micro metal particle spraying, ion beaming, metal paste applying, or the like conducted directly to the vertical surfaces 36 and 43 of the grooves 37 and 44 is suitably used; however, a resin film with a reflective coating formed on it by, e.g., sputtering or metal evaporating may be attached to the vertical surfaces 36 and 43 of the grooves 37 and 44. When conducting spattering, metal evaporation, micro metal particle spraying, ion beaming, or the like directly to the vertical surfaces 36 and 43 of the grooves 37 and 44, the metal particles are directed onto the vertical surfaces 36 and 43 from a diagonally above direction along the inclined surfaces 35 and 42 in a vacuum or under low pressure, such that the inclined surfaces 35 and 42 are not subject to the metal particles aimed at the vertical surfaces 36 and 43. To the bottom portions of the grooves 37 and 44, the micro flat portions 39 and 46 are respectively formed. This lessens occurrence of attachment of the metal particles to the inclined surfaces 35 and 42, and besides, this helps the metal particles to be evenly applied to the vertical surfaces 36 and 43 down to the lower edge. Instead of being formed into a flat shape, each of the inclined surfaces 35 and 42 of the grooves 37 and 44 may be a polygonal face with a polygonal-cross-section that is depressed toward the inside of each of the ridges 38 and 45, a concave face with an arc-like cross-section, or an uneven face with a large number of micro unevenness (i.e., scratches) on the surface, to prevent the attachment of the metal particles.

As the method for filling up the grooves 37 and 44 with the transparent resin 48 and integrating the first and second light-control parts 31 and 33, it may be that in a state where the first and second light-control parts 31 and 33 are disposed to face each other such that the one side of the first light-control part 31 and the other side of the second light-control part 32, i.e., the sides on which the grooves 37 or 44 are formed, are opposed to each other, a sheet-like transparent resin having a melting point lower than the first and second transparent resins is tucked in between the first and second light-control parts 31 and 33, and the first and second light-control parts 31 and 32 with the sheet-like transparent resin in-between are heated and pressed in a vacuum in order to melt only the sheet-like transparent resin and then solidify it. Alternatively, it may be that after separately filling up the grooves 37 and 44 with a transparent adhesive made of a transparent resin, the transparent adhesive is hardened while the grooves 37 of the first light-control part 31 and the grooves 44 of the second light-control part 33 are faced each other and pushed together.

As the transparent adhesive, a heat-curing adhesive or a two-component adhesive may be used other than a light-curing adhesive that hardens upon being irradiated with, e.g., ultraviolet light. In particular, in order to make the refractive index η3 get closer to the refractive indexes η1 and η2, an optical adhesive or the like made of a refractive-index-adjusted resin with an adjusted refractive index is suitable for use.

In cases where the inclined surface of each groove is a polygonal face, a concave face, an uneven face or the like, the anchor effect enhances the adhesion between the inclined surface and the transparent resin filling the groove, and thus the inside of the groove is filled up with the transparent resin without any gaps and the unevenness is eliminated. As the result, light passes through while no irregular reflection (i.e., no scattering of the light) at the boundary face between the inclined surface and the transparent resin occurs and refraction of the light is minimized; therefore, this makes it possible to obtain a bright clear aerial image.

The behavior of the optical image-forming means 27 will be explained next.

In FIG. 2, when an image is displayed on the display 11, light of the image displayed on the display 11 is radiated toward the optical image-forming means 27. As shown in FIGS. 3(A) and 3(B), when light L1 enters the second light-control part 33 of the optical image-forming means 27 through a position of P1, the light L1 reflects off the light reflecting surface 32 at a position of P2 and enters the first light-control part 31. Then, after reflecting off the light reflecting surface 30 at a position of P3, the light L1 exits from the first light-control part 31 through a position of P4 into the air and forms an image. Here, although the light L1 enters the first light-control part 31 from the transparent resin 48 through Q1 in FIG. 3(A), the refractive index η1 of the first transparent resin forming the first light-control part 31 approximates to (i.e., approximately the same as) the refractive index η3 of the transparent resin 48, and thus phenomena such as total reflection or dispersion of light do not occur. Also, although the light L1 enters the transparent resin 43 from the second light-control part 33 through S1 in FIG. 3(B), the refractive index η2 of the second transparent resin forming the second light-control part 33 approximates to (i.e., approximately the same as) the refractive index η3 of the transparent resin 48, and thus phenomena such as total reflection or dispersion of light do not occur. Note that although refraction occurs also at the positions of P1 and P4, the refractions at P1 and P4 cancel cut each other. Additionally, both top side and back side (i.e., left side and right side in FIGS. 3(A) and 3(B)) of each of the light reflecting surfaces 30 and 32 are capable of serving as light reflecting surfaces.

There may be cases where, during the process of producing the first and second light-control parts 31 and 33, metal reflective coatings happen to be formed also on the micro flat portions 40 and 47 that are on the top portions of the vertical surfaces 36 and 43. Leaving the metal reflective coatings as formed makes a situation where micro light-reflecting surfaces exist in the optical image-forming means 21, and by this, the image-forming quality of the optical image-forming means deteriorates. To cope with this, it is preferred that the micro light-reflecting surfaces be eliminated by removing the metal reflective coatings formed on the micro flat portions 40 and 47 to make them light-transmitting surfaces (i.e., non-light-reflecting surfaces) or by forming light-absorbing layers (i.e., non-light-reflecting surfaces) colored in black (an example of light-ray absorbing colors) on top and back sides of the metal reflective coatings.

With the optical image-forming means 27 configured as described above, since the light emitted from the image displayed on the display 11 disposed on the one side of the optical image-forming means 27 makes mirror-reflection off the light reflecting surface 32 and makes mirror-reflection for the second time off the light reflecting surface 30 above the light reflecting surface 32, the light forms an image in a space on the other side of the optical image-forming means 27 as a first real image 13 as shown in FIG. 2. At this time, also infrared light emitted by the infrared-light emitting elements 15 to the space enters the optical image-forming means 27 from the one side of the optical image-forming means 27 and is directed onto the first real image 13 formed on the other side of the optical image-forming means 21 so as to spread into a sheet-like state and be superimposed on the entire surface of the first real image 13; however, it is invisible to the eye.

Then, when the indicating means 14 touches the first real image 13 of the display 11, infrared light having reflected off the indicating means 14 enters the optical image-forming means 27 from the other side of the optical image-forming means 27, an image of it (i.e., an infrared image formed by the reflected light into the shape of the indicating means 14) is formed on the surface of the display sheet 10 placed on the display 11 disposed on the one side of the optical image-forming means 27, as a second real image 49. The second real image 49 is invisible to the eye because it is formed by infrared light; however, the position of the second real image 49 can be detected by using the infrared-light receiving elements 16. Therefore, input work can be done while the positions indicated (i.e., touched) by the indicating means 14 with respect to the first real image 13 are being easily and reliably detected. At this time, in cases where a high-frequency modulation or a digital modulation is applied to the infrared light emitted by the infrared-light emitting elements 15, the infrared light having reflected off the indicating means 14 can be distinguished from infrared light existing in nature by using the infrared-light receiving elements 16, and this enhances the detection accuracy when detecting the positions indicated by the indicating means 14. Using this display sheet 10 eliminates the necessity of incorporating infrared-light emitting elements and infrared-light receiving elements inside a display and of installing an external infrared-light emitting means, infrared camera, and the like, and this makes it possible to easily configure a contactless input device by using an existing display.

Additionally, as shown in FIG. 2, a frame body 50 may be so disposed as to surround the first real image 13, and by this, the area to be operated with the indicating means 14 can be clarified. Instead of so disposing the frame body 50, a frame may be displayed together with the image displayed on the display 11 so that the frame will be displayed in the air as a part of the first real image. Regarding part of the indicating means 14 that does not reach the image-formed surface 11a, the image-forming position of it becomes a position beyond the surface of the display 11 (i.e., on the back side of the display 11). In this case, on the surface of the display 11 an out-of-focus image of the part of the indicating means 14 becomes displayed. So, the difference of luminance gradient or the like is detected with the infrared-light, receiving elements 16, or a focus evaluating means for, e.g., detecting only focused images is installed, so as to eliminate the data of such an out-of-focus image. Then, by calculating the center of the image of the indicating means 14, the indicated position on the display 11 is detected, while, regarding part of the indicating means 14 that goes further than the image-formed surface 11a, the image-forming position of it becomes a position nearer than the surface of the display 11 (i.e., on the optical image-forming means 27 side), and thus the same treatment as mentioned above is conducted to eliminate the data of out-of-focus images.

The present invention has been described above with reference to the embodiment. However, the present invention is not limited to the configurations described in the above embodiment, and the present invention includes other embodiments and modifications conceivable within the scope of the matters described in the scope of the claims.

For example, the image to be displayed on the display, and therefore the first real image, is not limited to be a flat image, but may be a three-dimensional image. In this case, part (i.e., a specific depth position) of the three-dimensional image formed as the first real image may be surrounded by a frame body so that input can be done by touching the first real image within the range surrounded by the frame body. For instance, when a three-dimensional image of push-button switches such as a keyboard is formed as the first real image, disposing the frame body so as to be flush with the surface (i.e., the height) of the push-button switches make it possible to smoothly touch the surface of the three-dimensional image (i.e., the first real image) of the push-button switches to conduct input. At this time, by equipping the display with a function where the push-button switches emit light or change their displaying colors upon being touched, an observer (i.e., an input worker) can easily see on the first real image which push-button switch they have just touched is. Additionally, it may be so made as to emit a sound at timing when the indicating means touches the push-button switches so that the input can be confirmed.

In the above embodiment, either one or both of the infrared-light emitting elements and the infrared-light receiving elements are each provided with an enclosure. Instead of or in addition to the enclosures, louvers may be installed on the surface of the display sheet so that infrared light emitted by the infrared-light emitting elements does not become diffuse but is directed to within a predetermined range. Although the louvers are preferred to be arranged in a standing position so as to be perpendicular to the surface of the display sheet, they may be tilted if needed. The height of the louvers may be selected as appropriate depending on the distance from the display to the optical image-forming means and the angle cc made by the display and the optical image-forming means. The louvers work even only by being disposed along the outer edge of the display sheet; however, it is preferred that the louvers be arranged in parallel in plural rows so as to align with the arrangement (i.e. the pitch) of the infrared-light emitting elements, and in particular, when arranging the louvers in a grid pattern (i.e., in length and width directions), the diffusion of the infrared light can be effectively prevented. Incidentally, the louvers are preferred to be colored into, e.g., black so as not to transmit the infrared light. Also, by using the difference in intensity of infrared light received by each infrared-light receiving element, it may be judged that positions where an infrared-light intensity equal to or stronger than a predetermined value is obtained within the area of the second real image are in-focus positions (i.e., positions where the image is clear), and those positions may be detected as the positions having been indicated by the indicating means.

Although an optical image-forming means in which the first and second light-control parts are disposed such that the one sides (i.e., the sides on which the grooves are formed) of the first and second light-control parts come into contact with each other is used in the above embodiment, the optical image-forming means works as long as the light reflecting surfaces of the first light-control part and the light reflecting surfaces of the second light-control part are arranged to be orthogonal when viewed from above. Thus, there may be cases where the first and second light-control parts are arranged such that the one side of the first light-control part and the other side of the second light-control part come into contact with each other, or such that the other sides of the first and second light-control parts come into contact with each other. Moreover, the optical image-forming means may be configured by forming the first light-control part on one side of one transparent board material and forming the second light-control part on the other side of the transparent board material instead of using two transparent board materials zo form the first and second light-control parts separately and join them. Regarding the first and second light-control parts, confining gas such as air into the grooves or getting the grooves vacuum instead of forming the mirror surface (i.e., metal reflective surface) onto the vertical surface of each groove of the first and second molded-preform, and thereby using total reflection of light makes it possible to use the vertical surface of each groove as it is as a light reflecting surface.

Also, what is explained as the optical image-forming means in the above embodiment is an optical image-forming means including first and second light-control parts on each of which a plurality of the light reflecting surfaces are arranged linearly (in parallel). Other than this, an optical image-forming means including: a first light-control part on which a plurality of light reflecting surfaces are arranged radially; and a second light-control part on which a plurality of light reflecting surfaces are arranged concentrically, may be used. In this case, whereas the radial light-reflecting surfaces of the first light-control part are linearly provided centering a reference point X, the concentric light-reflecting surfaces of the second light-control part curve along concentric circles having as the center a reference point Y, which is overlaid with the reference point X when viewed from above. At each of the points where the radial light-reflecting surfaces of the first light-control part and the concentric light-reflecting surfaces of the second light-control part cross when viewed from above, the radial light-reflecting surface and the concentric light-reflecting surface are orthogonal. Therefore, the same behavior as in the above embodiment can be carried out.

In addition, as the optical image-forming means, for example, an optical imaging device described in Japanese Patent No. 5420774 may be used, or a plurality of unit optical elements, each of which is provided with two light-reflecting surfaces perpendicular to each other, arranged on a plane, described in Japanese Patent No. 4734652 may be used.

Note that since the optical image-forming means works as long as capable of forming in the air an image based on an image displayed on a display, for example, a two-sided reflector, a lens, or the like that has a large number of reflective surfaces perpendicular to each other may be used other than the optical image-forming means having the first and second light-control parts teamed with each other.

INDUSTRIAL APPLICABILITY

Merely by placing the display sheet according to the present invention on a display and teaming them with, e.g., an optical image-forming means, an aerial-image-forming type (i.e., contactless) input device can be obtained. By this, there is no need to separately prepare a dedicated display with an infrared-light emitting source or an infrared-light receiving part incorporated inside the display or a dedicated infrared-light emitter, and so a usual display can be used. Therefore, the device becomes less expensive.

REFERENCE SIGNS LIST

10: display sheet, 11: display, 11*a*: image-formed surface, 12: contactless input device, 13: first real image, 14: indicating means, 15: infrared-light emitting element, 16: infrared-light receiving element, 17: transmitting portion, 19, 20, 21, 22: transparent electrode, 23: enclosure (partition), 24, 25: protection board, 27: optical image-forming means, 30: light reflecting surface, 31: first light-control part, 32: light reflecting surface, 33: second light-control part, 34: first transparent board material, 35: inclined surface, 36: vertical surface, 37: groove, 38: ridge, 39, 40: micro flat portion, 41: second transparent board material, 42: inclined surface, 43: vertical surface, 44: groove, 45: ridge, 46, 47: micro flat portion, 48: transparent resin, 49: second real image, 50: frame body

The invention claimed is:

1. A display sheet to be used while being placed on a usual display and teamed with an aerial-image-forming type optical image-forming means to obtain a contactless input device, the display sheet comprising:
    a plurality of infrared-light emitting elements emitting infrared light to a space;
    a plurality of infrared-light receiving elements receiving infrared light from the space; and
    a plurality of transmitting portions formed with a transparent material and passing light emitted from the display to the space,
    wherein the infrared-light emitting elements, the infrared-light receiving elements, and the transmitting portions are formed into a sheet in a state of being arranged side by side in a width direction of the sheet on a same plane so as not to overlap one another.

2. The display sheet set forth in claim 1, wherein either one or both of the infrared-light emitting elements and the infrared-light receiving elements are each provided with an enclosure, and
    wherein the enclosure prevents the infrared light emitted by the infrared-light emitting elements from being directly received by the infrared-light receiving elements.

3. The display sheet set forth in claim 1, wherein a high-frequency modulation or a digital modulation is applied to the infrared light emitted by the infrared-light emitting elements.

4. The display sheet set forth in claim 2, wherein a high-frequency modulation or a digital modulation is applied to the infrared light emitted by the infrared-light emitting elements.

* * * * *